United States Patent
Moshayedi et al.

(10) Patent No.: US 10,733,122 B2
(45) Date of Patent: *Aug. 4, 2020

(54) SYSTEM AND METHOD FOR DIRECT MEMORY ACCESS IN A FLASH STORAGE

(71) Applicant: Western Digital Technologies, Inc., San Jose, CA (US)

(72) Inventors: Mark Moshayedi, Newport Coast, CA (US); Seyed Jalal Sadr, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,519

(22) Filed: Aug. 28, 2019

(65) Prior Publication Data

US 2019/0384730 A1 Dec. 19, 2019

Related U.S. Application Data (63) Continuation of application No. 15/971,971, filed on May 4, 2018, now Pat. No. 10,409,747, which is a
(Continued)

(51) Int. Cl.

| | | |
|---|---|---|
| *G06F 13/00* | (2006.01) | |
| *G06F 13/28* | (2006.01) | |
| *G06F 12/02* | (2006.01) | |
| *G06F 3/06* | (2006.01) | |
| *G06F 13/10* | (2006.01) | |
| *G06F 13/16* | (2006.01) | |
| *G06F 13/40* | (2006.01) | |
| *G06F 13/42* | (2006.01) | |

(52) U.S. Cl.
CPC ............ *G06F 13/28* (2013.01); *G06F 3/0611* (2013.01); *G06F 3/0659* (2013.01); *G06F 3/0679* (2013.01); *G06F 12/0246* (2013.01); *G06F 13/102* (2013.01); *G06F 13/1668* (2013.01); *G06F 13/4068* (2013.01); *G06F 13/42* (2013.01); *G06F 2212/7202* (2013.01)

(58) Field of Classification Search
CPC ...................................................... G06F 13/28
See application file for complete search history.

(56) References Cited

U.S. PATENT DOCUMENTS

| | | |
|---|---|---|
| 5,263,003 A | 11/1993 | Cowles |
| 5,619,728 A | 4/1997 | Jones et al. |

(Continued)

*Primary Examiner* — Tammara R Peyton
(74) *Attorney, Agent, or Firm* — Morgan, Lewis & Bockius LLP (57) ABSTRACT

A flash storage device provides direct memory access based on a first communication protocol. A host selects the first communication protocol and provides a request to the flash storage device for a direct memory access. Additionally, the host provides data blocks to the flash storage device for the direct memory access. In the first communication protocol, the host need not provide an address to the flash storage device for the direct memory access. The flash storage device stores the data blocks at sequential addresses starting at a predetermined address in the flash storage device. Another host may then select a second communication protocol and transfer the data blocks in the flash storage by using the second communication protocol.

20 Claims, 3 Drawing Sheets

Related U.S. Application Data continuation of application No. 15/156,267, filed on May 16, 2016, now Pat. No. 9,990,315, which is a continuation of application No. 12/508,531, filed on Jul. 23, 2009, now Pat. No. 9,342,445.

(56) References Cited

U.S. PATENT DOCUMENTS

| | | | |
|---|---|---|---|
| 5,924,113 | A | 7/1999 | Estakhri et al. |
| 6,711,059 | B2 | 3/2004 | Sinclair et al. |
| 6,721,212 | B2 | 4/2004 | Sasaki |
| 6,768,722 | B1 | 7/2004 | Katseff |
| 6,804,742 | B1 | 10/2004 | Kitamura et al. |
| 6,917,994 | B2 | 7/2005 | Maone |
| 7,254,667 | B2 | 8/2007 | Tran |
| 7,581,054 | B2 | 8/2009 | Hagiwara |
| 7,865,784 | B1 | 1/2011 | White |
| 8,996,784 | B2 * | 3/2015 | Tsai .................... G06F 12/0862 711/103 |
| 9,342,445 | B2 | 5/2016 | Moshayedi |
| 9,990,315 | B2 | 6/2018 | Moshayedi |
| 10,409,747 | B2 * | 9/2019 | Moshayedi ........... G06F 3/0611 |
| 2003/0123287 | A1 | 7/2003 | Gorobets |
| 2003/0137881 | A1 | 7/2003 | Sasaki |
| 2003/0182495 | A1 | 9/2003 | Chang |
| 2004/0068590 | A1 | 4/2004 | Nishino et al. |
| 2004/0243906 | A1 | 12/2004 | Huang |
| 2005/0027928 | A1 | 2/2005 | Avraham et al. |
| 2005/0030801 | A1 | 2/2005 | Perroni |
| 2005/0120146 | A1 | 6/2005 | Chen et al. |
| 2005/0188121 | A1 | 8/2005 | Cho |
| 2006/0053244 | A1 | 3/2006 | Fruhauf |
| 2006/0176068 | A1 | 8/2006 | Holtzman |
| 2007/0101096 | A1 | 5/2007 | Gorobets |
| 2007/0162679 | A1 | 7/2007 | Wang |
| 2007/0174602 | A1 | 7/2007 | Kao |
| 2008/0082735 | A1 | 4/2008 | Shiga |
| 2008/0162835 | A1 | 7/2008 | Wilson |
| 2008/0189555 | A1 | 8/2008 | Sohn |
| 2008/0250194 | A1 | 10/2008 | Chen |
| 2009/0193184 | A1 | 7/2009 | Yu et al. |
| 2009/0210637 | A1 | 8/2009 | Yung |
| 2010/0169546 | A1 | 7/2010 | Van Acht et al. |
| 2010/0211535 | A1 | 8/2010 | Rosenberger |

* cited by examiner

SYSTEM AND METHOD FOR DIRECT MEMORY ACCESS IN A FLASH STORAGE

CROSS-REFERENCE TO RELATED APPLICATIONS

The present application is a continuation of application Ser. No. 15/971,971, filed on May 4, 2018, now U.S. Pat. No. 10,409,747, which is a continuation of application Ser. No. 15/156,267, filed on May 16, 2016, now U.S. Pat. No. 9,990,315, which is a continuation of application Ser. No. 12/508,531, filed on Jul. 23, 2009, now U.S. Pat. No. 9,342,445, the entirety of each of which is incorporated herein by reference.

BACKGROUND

Field of Invention

The present invention generally relates to flash storage devices, and more particularly to a direct memory access system and method for a flash storage device.

Description of Related Art

A computer system often includes a direct memory access (DMA) controller in addition to a processor and a memory. The direct memory access controller transfers data between a peripheral device and the memory without significant involvement of the processor. Because the processor is not substantially involved in the data transfer, the processor may simultaneously perform other tasks while the direct memory access controller performs the data transfer.

The processor typically initiates a direct memory access by providing an address to the direct memory access controller. The direct memory access controller transfers data in the memory at the address, increments the address, and then transfers data at the incremented address. This process repeats until the direct memory access is complete. The direct memory access controller may include a significant amount of resources, such as a dedicated processor or programmable logic, for performing this process. Some computing systems, such as embedded computing systems, may lack available resources, such as dedicated processors or programmable logic, for implementing a conventional direct memory access controller but would benefit from the advantages of direct memory access.

In light of the above, there exists a need to provide direct memory access for different types of computing systems.

SUMMARY

In various embodiments, a host selects a communication protocol and provides a request to a flash storage device for a direct memory access. Additionally, the host provides data blocks to the flash storage device for the direct memory access. In the communication protocol, the host need not provide an address to the flash storage device for the direct memory access. The flash storage device stores the data blocks into a flash storage at sequential addresses starting at a predetermined address. Another host may then select another communication protocol and transfer the data blocks in the flash storage device by using this other communication protocol.

In the direct memory access, the data blocks are transferred from the host to the flash storage device without the need for passing the data blocks through a central processing unit. Because the data blocks need not pass through a central processing unit, the data blocks are transferred from the host to the flash storage device more quickly than may occur in other systems or devices in which the data blocks must pass through a central processing unit. In this way, the data transfer rate of the flash storage device is increased by using a direct memory access.

A method of transferring data in a flash storage device, in accordance with one embodiment, includes receiving a request from a host by the flash storage device. The method further includes performing a direct memory access based on the request at a predetermined address of the flash storage device. In a further embodiment, the direct memory access may be performed by using a first communication protocol, and transferring data in the flash storage device may be performed by using a second communication protocol.

A system, in accordance with one embodiment, includes an interface, a controller, and a flash storage. The controller is coupled to the interface and the flash storage. The interface receives a request for a direct memory access. The controller transfers data blocks in the flash storage at a predetermined address. In a further embodiment, the interface includes a protocol controller for performing the direct memory access according to a first communication protocol and a protocol controller for transferring data in the flash storage according to a second communication protocol.

A system, in accordance with one embodiment, includes a means for receiving a request. The system further includes a means for performing a direct memory access based on the request at a predetermined address of a flash storage. In a further embodiment, the means for performing the direct memory access may store data blocks into the flash storage in the direct memory access. The system may also include a means for reading the data blocks in the flash storage. Additionally, the system may include a means for selecting a first communication protocol for the direct memory access and a means for selecting a second communication protocol for transferring the data blocks.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DESCRIPTION

In various embodiments, a host writes data to a flash storage device in a direct memory access by using a communication protocol. In the communication protocol, the flash storage device determines addresses for the direct memory access and thus the host need not provide an address to the flash storage device. In the direct memory access, data is transferred from the host to the flash storage device based on the addresses. Another host may then read the data in the flash storage device by using another communication protocol, such as a standard communication protocol.

Figure 1:
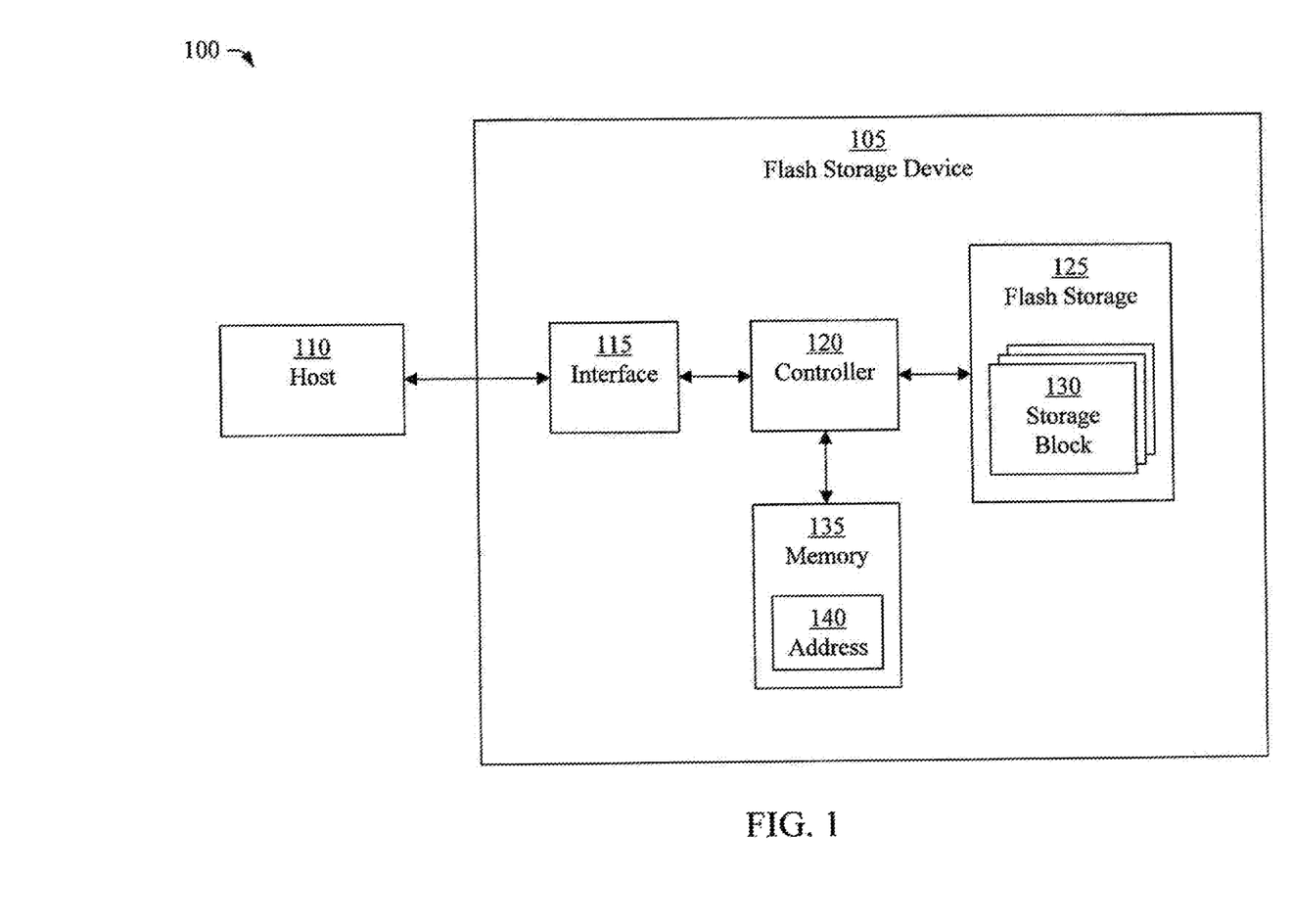
FIG. 1 is a block diagram of an electronic system, in accordance with an embodiment of the present invention.

FIG. 1 illustrates an electronic system 100, in accordance with an embodiment of the present invention. The electronic system 100 includes a host 110 and a flash storage device 105 coupled to or in communication with the host 110. The host 110 transfers data with the flash storage device 105, as described more fully herein. The host 110 may be any computing or electronic device, such as a computer workstation, an embedded computing system, a network router, a portable computer, a personal digital assistant, a digital camera, a digital phone, a processing device, or the like. In one embodiment, the host 110 is implemented in an integrated circuit (IC) packaged as a computer chip. The flash storage device 105 may be any flash storage device, such as a solid-state drive, a flash memory card, a secure digital (SD) card, a universal serial bus (USB) memory or storage device, a flash storage array, a memory stick, a CompactFlash card, or the like.

The flash storage device 105 includes an interface 115, a controller 120, a flash storage 125, and a memory 135. The interface 115 is coupled in communication with the host 110 and the controller 120. The controller 120 is coupled to the flash storage 125 and the memory 135. The flash storage 125 includes storage blocks 130 for storing data. The memory 135 stores an address 140 of the flash storage 125, which may include an address of one of the storage blocks 130. The memory 135 may be a random access memory (RAM), a static random access memory (SRAM), a dynamic random access memory (DRAM), a non-volatile memory, a flash storage, a register, firmware, a logic circuit, or the like.

In operation, the interface 115 receives a request from the host 110 for performing a direct memory access and passes the request to the controller 120. Additionally, the interface 115 transfers, or facilitates the transfer of data, such as data blocks, between the host 110 and the controller 120 for the direct memory access. A data block may be any unit of data. For example, a data block may be a data bit, a data byte, a data word, a memory page, a logic sector, a data record, a data file, or the like. The controller 120 obtains the address 140 stored in the memory 135 and transfers the data blocks in the flash storage 125 at sequential addresses starting at the address 140. If the request is a read request, the controller 120 reads the data blocks from the flash storage 125. If the request is a write request, the controller 120 writes the data blocks into the flash storage 125.

In various embodiments, the controller 120 transfers the first data block of the direct memory access at the address 140 in the flash storage 125. The controller 120 then increments the address 140 to determine a next address and transfers the data block at the next address. The controller 120 repeats this process for any additional data blocks in the direct memory access. Because the controller 120 determines an address for each data block in the direct memory access, the host 110 need not include an address in the request for the direct memory access. Moreover, the host 110 need not include logic to generate an address for the direct memory access, which allows for a reduction in size, cost or complexity of the host 110.

In one embodiment, each of the storage blocks 130 in the flash storage 125 have a logical block address. The address 140 may be the first logical block address of a storage block 130 in the flash storage 125 (e.g., logical block address 0) or another logical block address of a storage block 130. The first logical block address in the flash storage 125 follows the last logical block address in the flash storage 125, such that the sequence of logical block addresses wraps from the last logical block address to the first logical block address. In one embodiment, the controller 120 may overwrite previous data blocks of the request if the data blocks in the request exceed the capacity of the flash storage 125 to store the data blocks. The address 140 may be a fixed address (e.g., a predetermined address) or a selectable address. In one embodiment, the host 110 selects the address 140 before providing the request for the direct memory access to the flash storage device 105. For example, the host 110 provides a command including the address 140 (e.g., the selected address) to the flash storage device 105 and the flash storage device 105 stores the address 140 into the memory 135. In another embodiment, each of the storage blocks 130 in the flash storage 125 have a physical address instead of a logical block address. For example, each of the storage blocks 130 may have a physical block address.

In one embodiment, the controller 120 receives a request for a direct memory access and erases the storage blocks 130 in the flash storage 125 before writing the data blocks of the direct memory access to one of the storage blocks 130. In another embodiment, the controller 120 erases a storage block 130 before writing the data blocks of the direct memory access to that storage block 130. In this embodiment, the controller 120 need not erase all the storage blocks 130 in the flash storage 125 before writing a data block into the flash storage 125.

Figure 2:
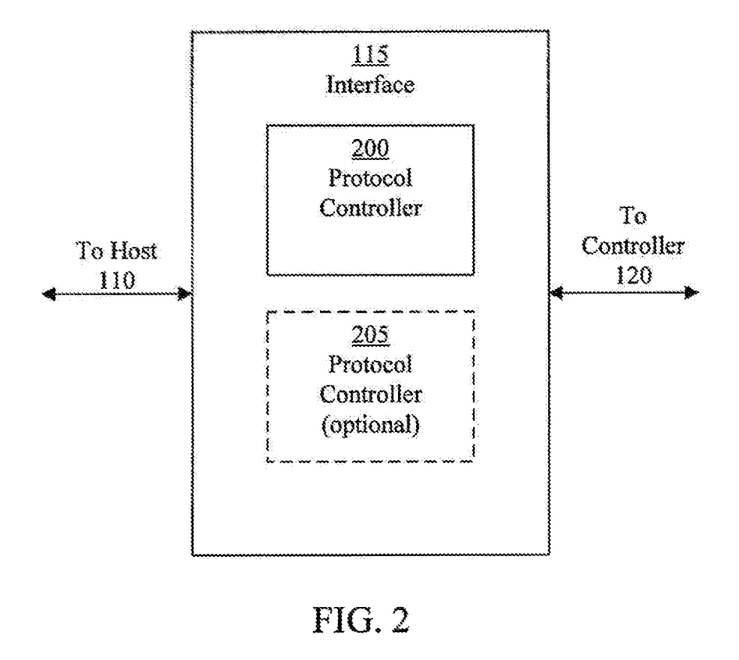
FIG. 2 is a block diagram of an interface, in accordance with an embodiment of the present invention.

FIG. 2 illustrates the interface 115, in accordance with an embodiment of the present invention. The interface 115 includes a protocol controller 200 for controlling communication between the host 110 and the flash storage device 105. In one embodiment, the protocol controller 200 receives signals from the host 110 and provides signals to the host 110 according to a communication protocol. The host 110 and the protocol controller 200 communicate with each other through these signals to perform a direct memory access. The communication protocol may be any communication protocol that allows the host 110 and the flash storage device 105 to perform a direct memory access without a need for the host 110 to provide an address to the flash storage device 105 for the direct memory access. For example, the host 110 and the flash storage device 105 may perform a direct memory access at a predetermined address in the flash storage device 105.

In one embodiment, the protocol controller 200 receives a request signal from the host 110 indicating a request for a direct memory access from the host 110 to the flash storage device 105. For example, the request signal may be a high or a low state on a pin or another input of the interface 115. In response to the request signal received from the host 110, the protocol controller 200 sends a signal to the controller 120 indicating that the flash storage device 105 received the request. In response to the signal from the protocol controller 200, the controller 120 may optionally perform an initialization operation to initialize the controller 120 and the flash storage 125. For example, the controller 120 may erase the storage blocks 130 in the flash storage 125 or may initialize registers or state machines in the controller 120. Additionally, the controller 120 provides a signal to the protocol controller 200 indicating that the controller 120 is ready to transfer data for the request. In turn, the protocol controller 200 provides a ready signal to the host 110 indicating that the flash storage device 105 is ready to perform the direct memory access with the host 110. The signal indicating that the controller 120 is ready to transfer data for the request may be a low or high state on a pin or other input of the interface 115. For example, the signal may be a low or high state on an otherwise unused pin of the interface 115. The signal indicating that the flash storage device 105 is ready to perform the direct memory access may be a low or high state on a pin or other input of the host 110. In some embodiments, the host 110 receives the ready signal from the flash storage device 105 and sends an acknowledgement signal to the protocol controller 200. The acknowledgment signal indicates a start of the data transfer in the direct memory access.

In the direct memory access, the host 110 sends a first data block to the flash storage device 105 and asserts a write signal. For example, the host 110 provides the first data block to the flash storage device 105 through a data bus and provides the write signal to the flash storage device 105 through a control bus. In response to the write signal, the protocol controller 200 receives the first data block and provides the first data block to the controller 120. The host 110 then deasserts the write signal according to the communication protocol. For example, the communication protocol may specify a minimum time between assertion and deassertion of the write signal. The host 110 then sends the next data block to the flash storage device 105 and asserts the write signal once again. In response to this write signal, the protocol controller 200 receives this data block and provides this data block to the controller 120. This process is repeated until the host 110 sends all the data blocks of the direct memory access to the flash storage device 105. The host 110 then sends a completion signal to the protocol controller 200 indicating that all data blocks of the direct memory access have been transferred to the flash storage device 105.

In some embodiments, the host 110 sends the first data block of a sequence of data blocks to the flash storage device 105 and asserts a write signal. Further, the host 110 sends the other data blocks of the sequence to the flash storage device 105 and deasserts the write signal. In this way, the host 110 sends multiple data blocks to the flash storage device 105 in conjunction with the write signal. For example, the host 110 may send five, ten, sixteen, thirty-two, or sixty-four data blocks to the flash storage device 105 in conjunction with a write signal. In some embodiments, the flash storage device 105 generates a synchronization signal based on the data blocks for recognizing each of the data blocks sent from the host 110 in conjunction with the write signal.

The controller 120 receives the data blocks of the request from the protocol controller 200 and writes the data blocks into the flash storage 125 at sequential addresses starting with the address 140. In this process, the controller 120 reads the address 140 in the memory 135 and determines the sequential addresses based on the address 140. The address 140 may be a predetermined address, such as the first logical block address of a storage block 130 in the flash storage 125, or an address previously stored in the memory 135, as is described more fully herein. In one embodiment, the controller 120 first writes the data blocks into the memory 135 and then transfers the data blocks from the memory 135 into the flash storage 125. In another embodiment, the controller 120 writes the data blocks into the flash storage 125 without writing the data blocks into the memory 135. In various embodiments, the flash storage device 105 includes one or more data buffers for storing the data blocks during transfer of the data blocks into the flash storage 125.

In another embodiment, the protocol controller 200 receives a request signal from the host 110 indicating a request for a direct memory access from the flash storage device 105 to the host 110. In response to the request signal received from the host 110, the protocol controller 200 sends a signal to the host 110 indicating that the flash storage device 105 is ready to perform the direct memory access with the host 110. In some embodiments, the host 110 receives the ready signal from the protocol controller 200 and sends an acknowledgement signal to the protocol controller 200. In response to the acknowledgment signal from the host 110, the protocol controller 200 sends a signal to the controller 120 indicating the request for the direct memory access.

In response to the signal indicating the request for the direct memory access received from the protocol controller 200, the controller 120 reads data blocks in the flash storage 125 at sequential addresses starting at the address 140. In this process, the controller 120 reads the address 140 in the memory 135 and determines the sequential addresses based on the address 140. The address 140 may be a predetermined address, such as the first logical block address of a storage block 130 in the flash storage 125, or an address previously stored in the memory 135, as is described more fully herein. The protocol controller 200 sends a first data block to the host 110 and asserts a read signal. For example, the protocol controller 200 provides the first data block to the host 110 through a data bus and provides the read signal to the host 110 through a control bus. In response to the read signal, the host 110 stores the first data block. The protocol controller 200 then deasserts the read signal according to the communication protocol. For example, the communication protocol may specify a minimum time between assertion and deassertion of the read signal. The protocol controller 200 then sends the next data block to the host 110 and asserts the read signal once again. In response to this read signal, the host 110 stores this data block. This process is repeated until the protocol controller 200 sends all the data blocks of the direct memory access to the host 110. The protocol controller 200 then sends a completion signal to the host 110 indicating that all data blocks of the direct memory access have been sent to the host 110.

In some embodiments, the protocol controller 200 sends the first data block of a sequence of data blocks to the host 110 and asserts a read signal. Further, the protocol controller 200 sends the other data blocks of the sequence to the host 110 and deasserts the read signal. In this way, the protocol controller 200 sends multiple data blocks to the host 110 in conjunction with the read signal. For example, the protocol controller 200 may send five, ten, sixteen, thirty-two, or sixty-four data blocks to the host 110 in conjunction with a read signal. In some embodiments, the protocol controller 200 generates a synchronization signal and provides the synchronization signal to the host 110 for recognizing each of the data blocks sent from the protocol controller 200 in conjunction with the read signal.

In one embodiment, the interface 115 includes an optional protocol controller 205 in addition to the protocol controller 200. The protocol controller 205 receives signals from the host 110 and provides signals to the host 110 according to a communication protocol. The communication protocol of the protocol controller 205 may be any conventional or standard communication protocol, such as an Advanced Technology Attachment (ATA) protocol, an Integrated Drive Electronics (IDE) protocol, a Universal Serial Bus (USB) protocol, a Serial Peripheral (SP) protocol, a Small Computer System Interface (SCSI) protocol, a Fibre Channel protocol, an IEEE 1394 (Firewire) protocol, a Flash protocol, a Programmed Input/Output (PIO) protocol, an Ultra Direct Memory Access (uDMA) protocol, a serial protocol, a parallel protocol, a wireless protocol, or the like. The host 110 provides a select signal to the interface 115 to select either the communication protocol of the protocol controller 200 or the communication protocol of the protocol controller 205. In another embodiment, the interface 115 uses the communication protocol of the protocol controller 200 unless the interface 115 receives a select signal from the host 110. In an alternative embodiment, the interface 115 uses the communication protocol of the protocol controller 205 unless the interface 115 receives a select signal from the host 110.

In one embodiment, a first host 110 provides a select signal to the flash storage device 105 to select a first communication protocol and to write data into the flash storage device 105 in a direct memory access by using the first communication protocol. The flash storage device 105 is then disconnected from the first host 110 and connected to a second host 110. The second host 110 provides a select signal to the flash storage device 105 to select a second communication protocol and to read the data in the flash storage device 105 by using the second communication protocol. In this way, logic in the first host 110 for writing data into the flash storage device 105 in a direct memory access is reduced, and the second host 110 reads the data in the flash storage device 105 by using a different communication protocol than that used by the first host 110.

In another embodiment, the protocol controller 200 controls communications between the host 110 and the flash storage device 105 according to both a first communication protocol and a second communication protocol. The host 110 sends a select signal to the flash storage device 105 to select either the first communication protocol or the second communication protocol. In this embodiment, the second communication protocol is a standard communication protocol that has been extended (e.g., modified) to perform a direct memory access according to the first communication protocol. Moreover, the host 110 sends a request for a direct memory access to the protocol controller 200 by using signals in the second communication protocol.

In one embodiment, the second communication protocol is an ATA protocol. The host 110 sends a request to the flash storage device 105 by sending the RESET signal of the ATA protocol. The flash storage device 105 receives the RESET signal and interprets the signal as a request for a direct memory access according to the first communication protocol. The flash storage device 105 sends a ready signal to the host 110 by sending the DMARQ signal of the ATA protocol. The host 110 sends an acknowledgement signal to the flash storage device 105 by sending the DMACK signal of the ATA protocol. Additionally, the host 110 sends a write signal to the flash storage device 105 by sending the DIOW signal of the ATA protocol. The host 110 sends a read signal to the flash storage device 105 by sending the DIOR signal of the ATA protocol. The host 110 and the flash storage device 105 send data blocks to each other by sending DD signals of the ATA protocol (e.g., DD0-DD15). Other embodiments may implement the direct memory access by using other signals of the ATA protocol or by using a different second communication protocol.

Figure 3:
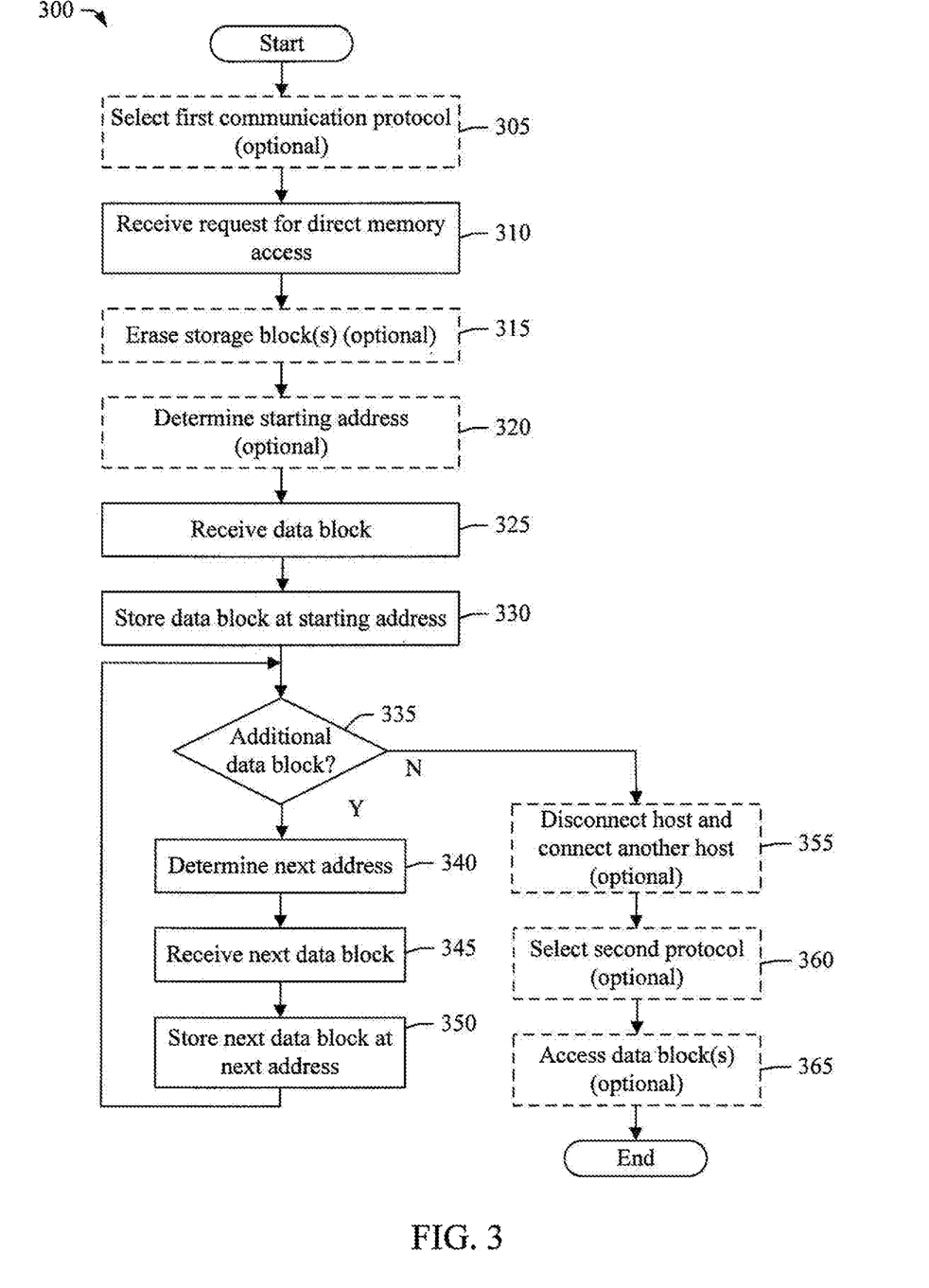
FIG. 3 is a flow chart for a method of performing a direct memory access, in accordance with an embodiment of the present invention.

FIG. 3 illustrates a method 300 of performing a direct memory access, according to an embodiment of the present invention. In optional step 305, the host 110 selects a first communication protocol. In one embodiment, the host 110 selects the first communication protocol by providing a select signal to the flash storage device 105. In embodiments without step 305, the flash storage device 105 performs the first communication protocol by default. For example, the flash storage device 105 may perform the first communication protocol on power-on or reset. The method 300 then proceeds to step 310.

In step 310, the flash storage device 105 receives a request for a direct memory access. The method 300 then proceeds to step 315.

In optional step 315, the flash storage device 105 erases the storage blocks 130 in the flash storage 125. In one embodiment, the controller 120 erases the storage blocks 130 in response to receiving the request for the direct memory access. In another embodiment, the controller 120 erases a storage block 130 after determining that a data block of the direct memory access is to be written into the storage block 130. The method 300 then proceeds to step 320.

In optional step 320, the flash storage device 105 determines a starting address for the direct memory access. In one embodiment, the controller 120 determines the starting address for the direct memory access by reading the address 140 in the memory 135. In embodiments without step 320, the starting address is a predetermined address. For example, the starting address may be a first logical block address in the flash storage 125, which is hard-wired in the controller 120 or the memory 135.

In other embodiments, the controller 120 stores the address 140. In one embodiment, the address 140 is a fixed address stored in the controller 120 during manufacture of the flash storage device 105. For example, the controller 120 may have a register or logic circuit that contains the address 140. In another embodiment, the address 140 is programmed into the memory 135 after manufacture of the controller 120. For example, the host 110 provides a command containing the address 140 to the controller 120, and the controller 120 stores the address 140 into the memory 135 based on the command. In other embodiments, the controller 120 stores the address during set-up or initialization of the controller 120 or at any time before the direct memory access is performed. The method 300 then proceeds to step 325.

In step 325, the flash storage device 105 receives a data block for the direct memory access. The method 300 then proceeds to step 330.

In step 330, the flash storage device 105 stores the data block at the starting address in the flash storage 125. In one embodiment, the controller 120 writes the data block into a storage block 130 of the flash storage 125 at the starting address. The method 300 then proceeds to step 335.

In step 335, the flash storage device 105 determines whether the direct memory access includes an additional data block. In one embodiment, the interface 115 determines whether the direct memory access includes an additional data block based on a signal from the host 110. If the direct memory access does not include an additional data block, the method 300 proceeds to step 355. Otherwise, the method 300 proceeds to step 340.

In step 340, arrived at from the determination in step 335 that the direct memory access includes an additional data block, the flash storage device 105 determines a next address for the direct memory access. In one embodiment, the controller 120 increments the address of the previous data block to determine the next address. For example, the controller 120 may increment the starting address to determine the address of a second data block to be transferred in the direct memory access. The method 300 then proceeds to step 345.

In step 345, the flash storage device 105 receives a next data block for the direct memory access. The method 300 then proceeds to step 350.

In step 350, the flash storage device 105 stores the next data block at the next address in the flash storage 125. In one embodiment, the controller 120 writes the next data block into a storage block 130 of the flash storage 125 at the next address. The method 300 then returns to step 335.

In optional step 355, arrived at from the determination in step 335 that the direct memory access does not include an additional data block, the host 110 (i.e., a first host) is disconnected from the flash storage device 105 and another host 110 (i.e., a second host) is connected to the flash storage device 105. In this process, the flash storage device 105 may be powered-down or reset, or both.

In various embodiments, the first host 110 is physically disconnected from the flash storage device 105 and the second host 110 is physically connected to the flash storage device 105. In some embodiments, the first host 110 is disconnected from the flash storage device 105 by interrupting a communication link between the first host 110 and the flash storage device 105, and the second host 110 is connected to the flash storage device 105 by establishing a communication link between the second host 110 and the flash storage device. For example, the communication links between the hosts 110 and the flash storage device 105 may be wireless communication links. The method 300 then proceeds to step 360.

In optional step 360, the host 110 sends a signal to the flash storage device 105 to select a second communication protocol. The host 110 that selects the second communication protocol in step 360 need not be the same host 110 that selects the first communication protocol in step 305. For example, the host 110 that selects the first communication protocol in step 305 may be a portable electronic device that does not support the second communication protocol. Further, the host 110 that selects the second communication protocol in step 360 may be a desktop computer that supports the second communication protocol. In this way, the portable electronic device stores data into the flash storage device 105 using the first communication protocol and the desktop computer reads the data from the flash storage device 105 using the second communication protocol.

In one embodiment, a first host 110 is connected to the flash storage device 105 and selects the first communication protocol in step 305. The first host 110 is then disconnected from the flash storage device 105 and a second host 110 is connected to the flash storage device 105 in step 355. The second host 110 then selects the second communication protocol in step 360. For example, the host 110 that selects the first communication protocol in step 305 may lack sufficient resources to support the second communication protocol. Nonetheless, the flash storage 125 may be disconnected from the host 110 that selected the first communication protocol in step 305 and then connected to another host 110 in step 355 that selects the second communication protocol in step 360. In this way, the host 110 that selects the first communication protocol in step 305 need not support the second communication protocol yet both of the hosts 110 are capable of communicating with the flash storage 125. In some embodiments, the flash storage device 105 requires a power-down or reset when the first host 110 is disconnected from the flash storage device 105 and the second host 110 is connected to the flash storage device 105. The method 300 then proceeds to step 365.

In optional step 365, the host 110 transfers the data blocks in the flash storage device 105 by using the second communication protocol. The host 110 may transfer the data blocks in the flash storage device 105 by reading a data block in the flash storage device 105. Alternatively, the host 110 may transfer the data blocks in the flash storage device 105 by overwriting a data block in the flash storage device 105. The method 300 then ends.

Although the invention has been described with reference to particular embodiments thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A computer-implemented method, comprising:
   receiving a select signal from a host, the select signal indicating selection of a first communication protocol or a second communication protocol different from the first communication protocol;
   when a request signal, indicating a request for a direct memory access operation, is received from the host, sending a ready signal to the host based on the request for the direct memory access operation;
   when the select signal indicates using the first communication protocol, performing the direct memory access operation for transferring data between the host and a storage device using the first communication protocol, wherein one or more controllers perform the direct memory access operation subsequent to sending the ready signal; and
   when the select signal indicates using the second communication protocol, transferring data between the host and the storage device using the second communication protocol.

2. The computer-implemented method of claim 1, further comprising:
   receiving a response signal, the response signal indicating readiness to transfer data for the request;
   sending the ready signal to the host based on the received response signal; and
   receiving an acknowledgement signal from the host based on the ready signal, wherein the direct memory access operation is performed subsequent to receiving the acknowledgement signal.

3. The computer-implemented method of claim 1, further comprising:
   obtaining at least one predetermined address from a plurality of predetermined addresses stored in a memory;
   determining whether the direct memory access operation is a read or write operation;
   transferring the data from the storage device at sequential addresses starting at, at least one predetermined address when the direct memory access operation is a read operation; and
   transferring the data to the storage device at sequential addresses starting at the at least one predetermined address when the direct memory access operation is a write operation.

4. The computer-implemented method of claim 1, wherein the request signal is processed by a first protocol controller when the select signal indicates the first communication protocol.

5. The computer-implemented method of claim 1, wherein the request signal is processed by a second protocol controller when the select signal indicates the second communication protocol.

6. A data storage system, comprising:
a storage device; and
one or more controllers configured to cause:
receiving a select signal from a host, the select signal indicating selection of a first communication protocol or a second communication protocol different from the first communication protocol;
when a request signal, indicating a request for a direct memory access operation, is received from the host, sending a ready signal to the host based on the request for the direct memory access operation;
when the select signal indicates using the first communication protocol, performing the direct memory access operation for transferring data between the host and the storage device, using the first communication protocol, wherein the one or more controllers are configured to perform the direct memory access operation subsequent to sending the ready signal; and
when the select signal indicates using the second communication protocol, transferring data between the host and the storage device, using the second communication protocol.

7. The data storage system of claim 6, wherein the one or more controllers comprise an interface and a controller, and wherein the interface is configured to:
process requests between the host and the storage device, the interface comprising a first protocol controller associated with the first communication protocol and a second protocol controller associated with the second communication protocol, wherein the controller is coupled to the storage device and the interface.

8. The data storage system of claim 6, wherein the one or more controllers comprise an interface and a controller, and wherein the interface is configured to cause:
receiving a response signal from the controller, the response signal indicating that the controller is ready to transfer data for the request;
sending the ready signal to the host based on the received response signal; and
receiving an acknowledgement signal from the host based on the ready signal, wherein the controller is configured to perform the direct memory access operation subsequent to receiving the acknowledgement signal.

9. The data storage system of claim 6, wherein the one or more controllers comprise a controller, and wherein the controller is configured to perform the direct memory access operation at a starting predetermined address in the storage device independent of the host providing an address of the storage device for the direct memory access operation.

10. The data storage system of claim 6, wherein the one or more controllers comprise a controller, and a memory coupled to the controller, the memory is configured to store a plurality of predetermined addresses of the storage device, wherein the controller is configured to cause:
obtaining at least one predetermined address from the plurality of predetermined addresses stored in the memory;
determining whether the direct memory access operation is a read or write operation;
transferring the data from the storage device at sequential addresses starting at, at least one predetermined address when the direct memory access operation is a read operation; and
transferring the data to the storage device at sequential addresses starting at the at least one predetermined address when the direct memory access operation is a write operation.

11. The data storage system of claim 7, wherein the request signal is processed by the first protocol controller when the select signal indicates the first communication protocol.

12. The data storage system of claim 7, wherein the request signal is processed by the second protocol controller when the select signal indicates the second communication protocol.

13. The data storage system of claim 6, wherein the one or more controllers are configured to write the data into the storage device in the direct memory access operation when the select signal indicates the first communication protocol.

14. The data storage system of claim 13, wherein the one or more controllers comprise an interface and a controller, wherein the interface is configured to cause:
receiving a write signal over a control bus to the host;
receiving, subsequent to receiving the write signal, a first data block of a sequence of data blocks from the host, the write signal being asserted at a start of the first data block; and
providing the first data block to the controller, the write signal being deasserted by the host according to the first communication protocol.

15. The data storage system of claim 14, wherein the first communication protocol specifies a minimum time between assertion and deassertion of the write signal.

16. The data storage system of claim 6, wherein the one or more controllers comprise an interface and a controller, wherein the controller is configured to cause:
reading the data from the storage device in the direct memory access operation when the select signal indicates the second communication protocol.

17. The data storage system of claim 16, wherein the one or more controllers comprise an interface and a controller, wherein the interface is configured to cause:
receiving a first data block of a sequence of data blocks;
asserting a read signal over a control bus to the host;
sending the first data block to the host, the read signal being asserted at start of the first data block; and
deasserting the read signal according to the second communication protocol.

18. The data storage system of claim 17, wherein the second communication protocol specifies a minimum time between assertion and deassertion of the read signal.

19. A data storage system, comprising:
means for receiving a select signal from a host, the select signal indicating selection of a first communication protocol or a second communication protocol different from the first communication protocol;
when a request signal, indicating a request for a direct memory access operation, is received from the host, means for sending a ready signal to the host based on the request for the direct memory access operation;
when the select signal indicates using the first communication protocol, means for performing the direct memory access operation for transferring data between the host and a storage device using the first communication protocol, wherein the means for performing the direct memory access operation is configured to perform the direct memory access operation subsequent to sending the ready signal; and
when the select signal indicates using the second communication protocol, means for transferring data between the host and the storage device using the second communication protocol.

20. The data storage system of claim 19, comprising
means for receiving a response signal indicating readiness to transfer data for the request;
means for sending the ready signal to the host based on the received response signal; and
means for receiving an acknowledgement signal from the host based on the ready signal, wherein the means for performing the direct memory access operation is configured to perform the direct memory access operation subsequent to receiving the acknowledgement signal.

* * * * *